(12) United States Patent
Ito (10) Patent No.: US 8,665,540 B2
(45) Date of Patent: Mar. 4, 2014

(54) LENS BARREL

(75) Inventor: Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/553,825

(22) Filed: Jul. 20, 2012

(65) Prior Publication Data

US 2013/0050855 A1 Feb. 28, 2013

(30) Foreign Application Priority Data

Aug. 24, 2011 (JP) .................. 2011-182397
Apr. 25, 2012 (JP) .................. 2012-100278

(51) Int. Cl.
*G02B 7/04* (2006.01)
*G02B 7/02* (2006.01)
*G02B 7/08* (2006.01)
*G02B 7/14* (2006.01)

(52) U.S. Cl.
CPC .. *G02B 7/04* (2013.01); *G02B 7/08* (2013.01); *G02B 7/14* (2013.01)
USPC ........... 359/823; 359/819; 359/822; 359/824; 359/826

(58) Field of Classification Search
USPC ................................. 359/819–826
See application file for complete search history.

(56) References Cited

U.S. PATENT DOCUMENTS 7,663,810 B2   2/2010   Watanabe et al.
7,672,579 B2 * 3/2010   Nomura .................... 396/73

FOREIGN PATENT DOCUMENTS

JP   H01-277810 A   11/1989
JP   2008-176128 A   7/2008

* cited by examiner

*Primary Examiner* — Scott J Sugarman
*Assistant Examiner* — Daniele Manikeu
(74) *Attorney, Agent, or Firm* — Shinjyu Global IP (57) ABSTRACT

A lens barrel is provided that includes a base, a motor, a drive gear, and a rotary frame. The motor is fixed to the base and produces a driving force. The drive gear is coupled to the base and configured to transmit the driving force. The rotary frame has a substantially cylindrical shape and a gear component disposed on at least part of its inner peripheral surface. The gear component meshes with the drive gear so that during rotation of the drive gear the rotary frame rotates, via the driving force, relative to the base component and advances and retracts along a rotational axis of the lens barrel. The length of the drive gear is greater than the length of the gear component, and as the rotary frame and the gear component advance and retract, the gear component remains within a range of opposing ends of the drive gear.

17 Claims, 11 Drawing Sheets

LENS BARREL

CROSS-REFERENCE TO RELATED APPLICATIONS

This application claims priority under 35 U.S.C. §119 to Japanese Patent Application No. 2011-182397, filed on Aug. 24, 2011, and Japanese Patent Application No. 2012-100278, filed Apr. 25, 2012. The entire disclosure of Japanese Patent Application No. 2011-182397 and Japanese Patent Application No. 2012-100278 are hereby incorporated herein by reference.

BACKGROUND

1. Technical Field

The technology disclosed herein relates to a lens barrel used in an imaging device.

2. Description of the Related Art

Imaging devices that produce image data about a subject have rapidly gained popularity in recent years.

A lens barrel for adjusting the focal distance is installed in an imaging device. Well known examples of imaging devices include cameras with integrated lenses, and cameras with interchangeable lenses. The lens barrel is built into a camera with an integrated lens.

A camera with an interchangeable lens has a camera body and an interchangeable lens unit that can be mounted to and removed from the camera body. With an interchangeable lens type of camera, the lens barrel is built into the interchangeable lens unit, for example (see, for example, Japanese Laid-Open Patent Application 2008-176128 and Japanese Laid-Open Patent Application H1-277810).

SUMMARY

With the above-mentioned conventional lens barrel, however, raising the performance of the imaging device increases the number of parts, and this tends to make the lens barrel larger in size.

Accordingly, one object of the technology disclosed herein is to provide a high-performance lens barrel that is also compact.

In accordance with one aspect of the technology disclosed herein, a lens barrel is provided that includes a base, a motor, a drive gear, and a rotary frame. The motor is fixed to the base and produces a driving force. The drive gear is coupled to the base and configured to transmit the driving force. The rotary frame has a substantially cylindrical shape and a gear component disposed on at least part of its inner peripheral surface. The gear component meshes with the drive gear so that during rotation of the drive gear the rotary frame rotates, via the driving force, relative to the base component and advances and retracts along a rotational axis of the lens barrel. The length of the drive gear is greater than the length of the gear component, and as the rotary frame and the gear component advance and retract, the gear component remains within a range of opposing ends of the drive gear.

Consequently, the length of the drive gear is greater than the length of the gear component, and the gear component is capable of moving within a range of the drive gear when the rotary frame advances and retracts. As a result, the length over which the gear component and the drive gear mesh is constant, which makes it easier to control the driving force of the rotary frame.

These and other objects, features, aspects and advantages of the present disclosure will become apparent to those skilled in the art from the following detailed description, which, taken in conjunction with the annexed drawings, discloses example embodiments of the present disclosure.

BRIEF DESCRIPTION OF DRAWINGS

Referring now to the attached drawings which form a part of this original disclosure.

DETAILED DESCRIPTION OF THE EMBODIMENTS

First Embodiment

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

The lens barrel 100 pertaining to Embodiment 1 comprises a rotary frame 20 and a motor 60 provided on the inside of the rotary frame 20.

A gear component 22 is formed on the inner peripheral surface 21 of the rotary frame 20.

The gear component 22 is driven in conjunction with the motor. Thus, the motor 60 can rotate the rotary frame 20 by meshing a drive gear 63 with the gear component 22.

The lens barrel 100 pertaining to this embodiment is characterized by the layout, shape, size, and so forth of the gear component 22, the drive gear 63, and so on. The lens barrel 100 in this embodiment may be an interchangeable lens that can be mounted to and removed from a camera body, or may be a lens barrel that is built into a camera.

The lens barrel 100 will now be discussed in detail through reference to the drawings.

1. Structure of Various Frames Constituting the Lens Barrel

Figure 1:
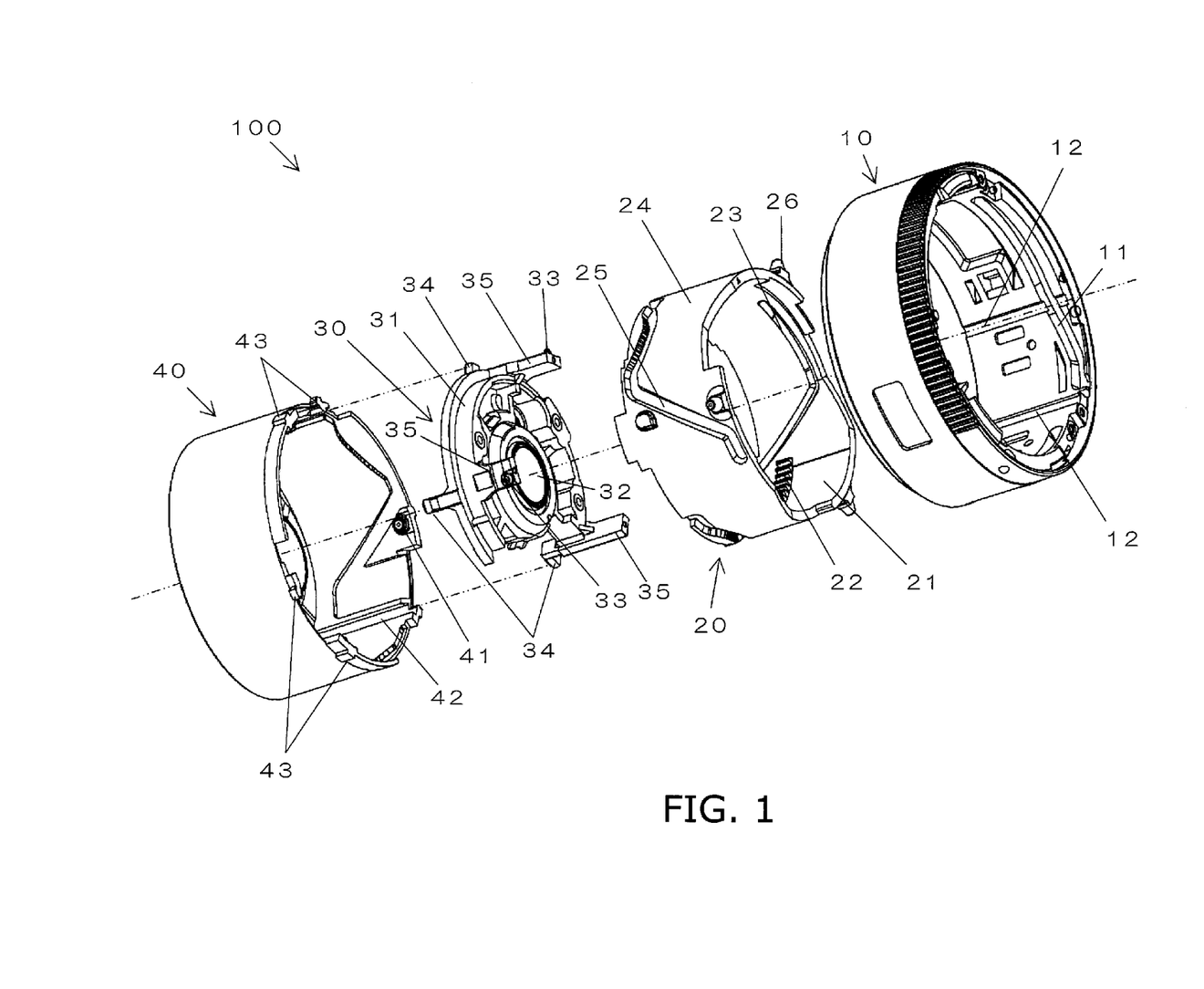
FIG. 1 is an exploded oblique view of the configuration of a lens barrel pertaining to an embodiment.

FIG. 1 is an exploded oblique view of the main members that make up the lens barrel 100 (a fixed frame 10, the rotary frame 20, a second lens frame 30, and a first lens frame 40).

The fixed frame 10 is fixed to the base 50 (discussed below). A cam groove 11 and a plurality of rectilinear grooves 12 are formed on the inner peripheral surface of the fixed frame 10.

The rotary frame 20 has a substantially cylindrical shape, and is supported rotatably with respect to the fixed frame 10 on the inner peripheral surface side of the fixed frame 10. As will be discussed below, since a cam follower 26 engages with the cam groove 11 on the fixed frame 10 side, the rotary frame 20 advances and retracts with respect to the fixed frame 10 in the rotational axis direction of the rotary frame 20 along with the rotational movement of the rotary frame 20 with respect to the fixed frame 10.

The gear component 22 and a cam groove 23 are formed on the inner peripheral surface 21 of the rotary frame 20. The teeth of the gear component 22 are formed along the rotational axis direction of the rotary frame 20.

A cam groove 25 and the cam follower 26 are formed in the outer peripheral surface 24 of the rotary frame 20. The cam follower 26 engages with the cam groove 11 in a state in which the rotary frame 20 has been attached to the fixed frame 10. Accordingly, when the rotary frame 20 rotates with respect to the fixed frame 10, the cam follower 26 moves along the cam groove 11, which includes a portion of the groove (a movement region 11b; see FIG. 2) formed at an angle with respect to the rotational axis direction of the rotary frame 20 on the inner peripheral surface of the fixed frame 10. Consequently, the rotary frame 20 advances and retracts with respect to the fixed frame 10 in the rotational axis direction of the rotary frame 20.

The second lens frame 30 has a second lens frame main body 31 and a lens 32 that is supported in the middle part of the second lens frame main body 31. The lens 32 constitutes part of an optical system supported by the lens barrel 100.

The second lens frame 30 also has a support component 35 that protrudes from the second lens frame main body 31 to the rotary frame 20. A cam follower 33 that protrudes outside from the outer peripheral surface side of the support component 35 is formed.

The cam follower 33 engages with the cam groove 23 formed in the inner peripheral surface of the rotary frame 20. As will be discussed below, movement of the second lens frame 30 in the rotational direction is restricted, and when the rotary frame 20 rotates, the cam follower 33 moves along the cam groove 23. Along with this, the second lens frame 30 advances and retracts with respect to the rotary frame 20 in the rotational axis direction of the rotary frame 20.

A rectilinear follower 34 is formed so as to protrude outward from the outer peripheral portion of the second lens frame 30. The rectilinear follower 34 engages with a rectilinear groove 42 formed in the inner peripheral surface of the first lens frame 40. As will be discussed below, movement of the first lens frame 40 in the rotational direction is restricted. Accordingly, when the rectilinear follower 34 engages with the rectilinear groove 42, movement of the second lens frame 30 in the rotational direction is also restricted.

The first lens frame 40 supports a lens (not shown). The lens supported by the first lens frame 40 constitutes part of the optical system supported by the lens barrel 100. A cam follower 41 and the rectilinear groove 42 are formed on the inner peripheral surface of the first lens frame 40.

The cam follower 41 engages with the cam groove 25 formed in the outer peripheral surface of the rotary frame 20. Accordingly, when the rotary frame 20 rotates with respect to the first lens frame 40, the cam follower 41 moves along the cam groove 25. Consequently, the first lens frame 40 advances and retracts with respect to the rotary frame 20 in the rotational axis direction of the rotary frame 20.

The rectilinear groove 42 engages with the rectilinear follower 34 formed on the outer peripheral surface of the second lens frame 30, and restricts movement of the second lens frame 30 in the rotational direction with respect to the inner peripheral surface of the first lens frame 40. The rectilinear groove 42 is also formed in the inner peripheral surface of the first lens frame 40, in a linear shape along the rotational axis direction of the second lens frame 30.

A rectilinear follower 43 that protrudes outside is formed on the outer peripheral surface of the first lens frame 40. The rectilinear follower 43 engages with the rectilinear grooves 12 formed on the inner peripheral surface side of the fixed frame 10. Consequently, movement of the first lens frame 40 in the rotational direction with respect to the inner peripheral surface of the fixed frame 10 is restricted.

Because the lens barrel 100 in this embodiment is constituted as above, a so-called telescoping lens barrel can be achieved by advancing and retracting the rotary frame 20 in the rotational axis direction with respect to the fixed frame 10. Specifically, when the lens barrel 100 is in use (during imaging and the preparatory period thereof), the rotary frame 20 is played out away from the fixed frame 10, which extends the overall length of the lens barrel 100. On the other hand, when the lens barrel 100 is not in use, the rotary frame 20 is pulled back into the interior of the fixed frame 10, which shortens the overall length of the lens barrel 100.

Also, the zoom ratio of the subject image formed by the lens 32 of the second lens frame 30 and the lens (not shown) supported by the first lens frame 40 can be adjusted by advancing and retracting the second lens frame 30 and the first lens frame 40 with respect to the rotary frame 20.

2. Structure of Fixed Frame 10 and Rotary Frame 20

Figure 2:
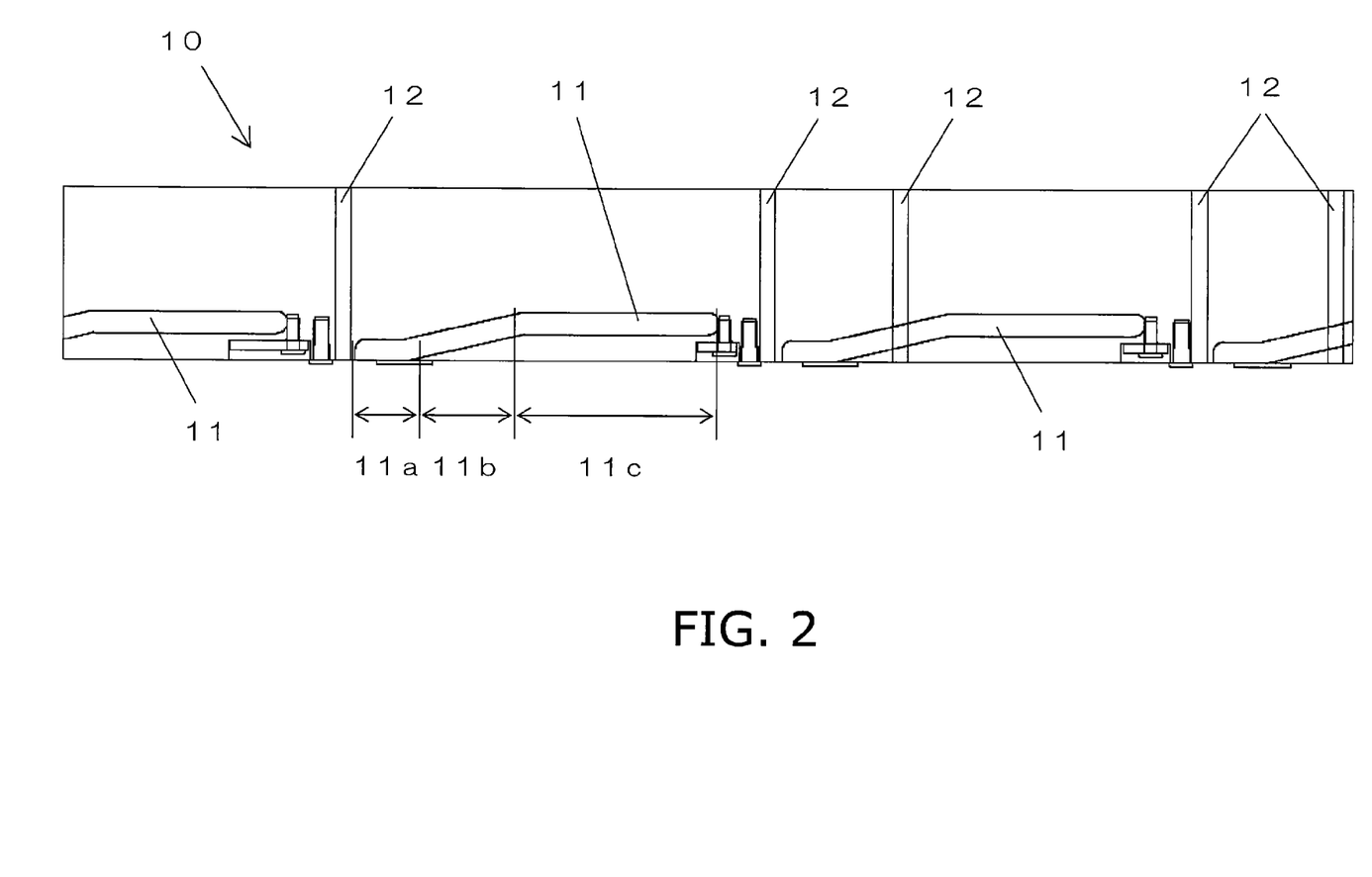
FIG. 2 is a development view of the inner peripheral surface side of a fixed frame included in the lens barrel in FIG. 1.

Next, the structure of the fixed frame 10 will be discussed in detail through reference to FIG. 2. FIG. 2 is a development view of the inner peripheral surface side of the fixed frame 10.

The cam groove 11 and the rectilinear grooves 12 are formed in the inner peripheral surface of the fixed frame 10.

The cam groove 11 is formed along a direction perpendicular to the advance and retraction direction of the rotary frame 20, along the inner peripheral surface of the fixed frame 10. The cam groove 11 has three regions: a stowage region 11a, a usage region 11c, and a movement region 11b that links the other two regions.

Here, when the cam follower 26 of the rotary frame 20 is located within the stowage region 11a, the rotary frame 20 is in a state of being pulled into the fixed frame 10. On the other hand, when the cam follower 26 is located within the usage region 11c, the rotary frame 20 is in a state of protruding from the fixed frame 10, which is the usage state of the lens barrel 100.

Figure 3:
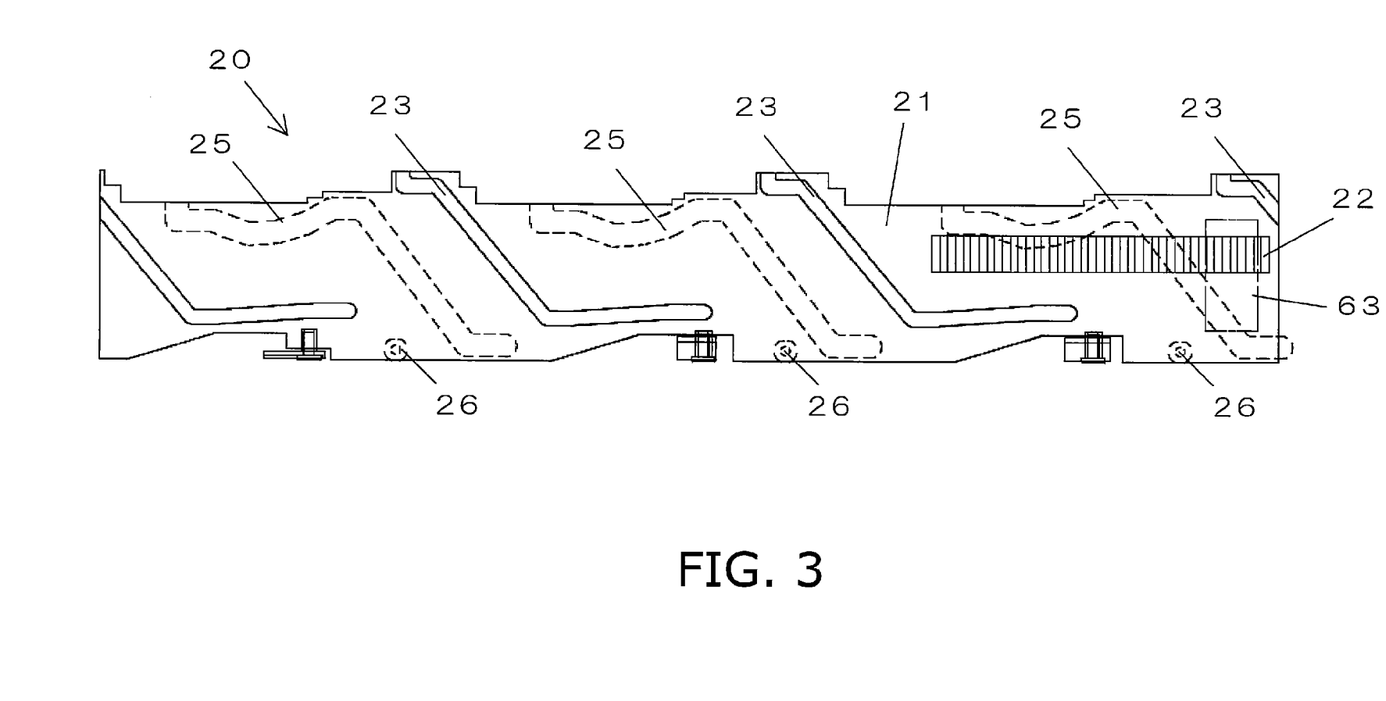
FIG. 3 is a development view of the inner and outer peripheral surface sides of a rotary frame included in the lens barrel in FIG. 1.

Next, the structure of the rotary frame 20 will be discussed in detail through reference to FIG. 3. FIG. 3 is a development view of the inner peripheral surface 21 of the rotary frame 20.

The cam groove 23, which guides the cam follower 33 of the second lens frame 30, is formed at three places in the inner peripheral surface 21. Also, the gear component 22 is formed at a position of the inner peripheral surface 21 where it will not interfere with the cam groove 23. In this embodiment, the gear component 22 is formed along a direction perpendicular to the rotational axis direction of the rotary frame 20. In the assembled state of the lens barrel 100, the gear component 22 meshes with the drive gear 63.

In FIG. 3, the drive gear 63 is depicted in order to facilitate an understanding of the meshing of the gear component 22 and the drive gear 63. However, the drive gear 63 is a separate member from the rotary frame 20, and the drive gear 63 is only shown in the inner peripheral surface development diagram of the rotary frame 20 for the sake of description.

The cam groove 25, which mates with the cam follower 41 of the first lens frame 40, and the cam follower 26, which mates with the cam groove 11 of the fixed frame 10, are each formed at three places in the outer peripheral surface 24 of the rotary frame 20. The cam groove 25 is formed from the end on the fixed frame 10 side of the outer peripheral surface of the rotary frame 20, to the end on the opposite side. The cam follower 26 is formed at the end on the fixed frame 10 side of the outer peripheral surface 24.

3. Structure of Base 50

Figure 4:
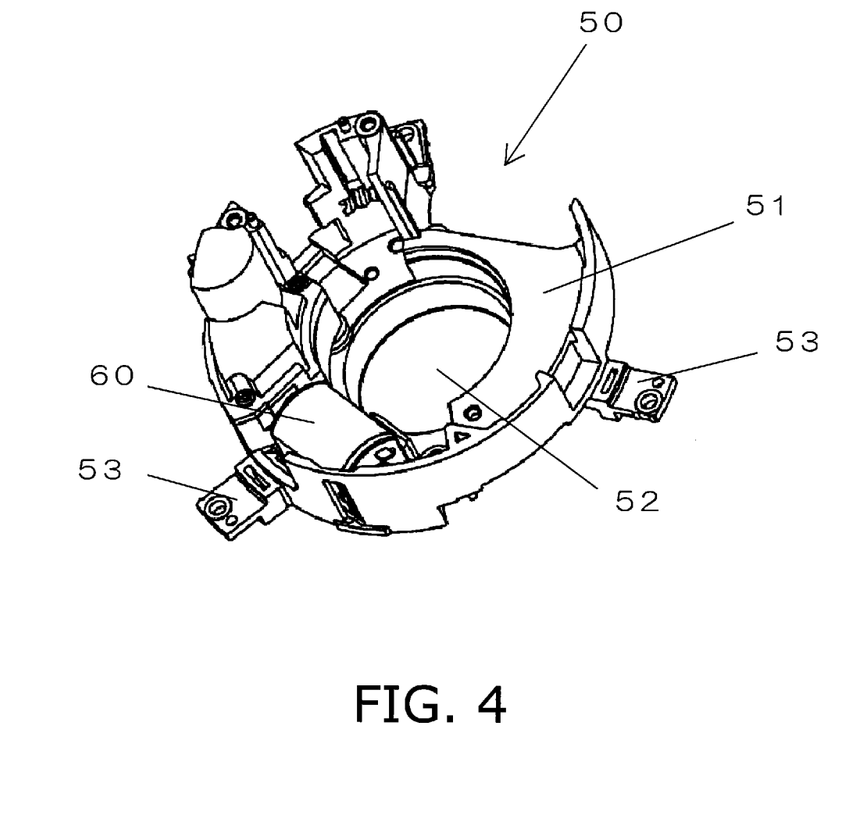
FIG. 4 is an oblique view of a fixed frame included in the lens barrel in FIG. 1.

Next, the structure of the base 50 will be discussed in detail through reference to FIGS. 4 and 5. FIG. 4 is an oblique view of a state in which the motor 60, a motor shaft gear 61, a reduction gear 62, and the drive gear 63 have been attached to the base 50. In actual practice, however, a cover is provided to the motor shaft gear 61, the reduction gear 62, and the drive gear 63, although not depicted in FIG. 4. The configuration including this cover will be discussed below through reference to FIG. 5.

The base 50 has a substantially doughnut-shaped disk 51 having an opening 52 formed in its center, and a fixed component 53 protruding outward in the radial direction from the disk 51.

The motor 60 is fixed to the disk 51. The motor shaft gear 61, the reduction gear 62, and the drive gear 63 are rotatably attached to the disk 51. The motor shaft gear 61, the reduction gear 62, and the drive gear 63 do not move with respect to the base 50.

Light from a subject that has been converged by the lens barrel 100 goes through the opening 52 formed in the center of the disk 51 and reaches an imaging element at the rear. That is, the opening 52 must be provided to the center of the disk 51 in a size that is large enough to allow light from the subject to pass through. On the other hand, if the outside diameter of the disk 51 is increased, the size of the overall lens barrel 100 ends up being larger, so the outside diameter of the disk 51 must be kept as small as possible. Thus, the disk 51 usually ends up being narrow in width. Accordingly, how compactly the motor 60 is fixed to the disk 51 is important in terms of obtaining a lens barrel that is high in performance and also compact. More specifically, to reduce the outside diameter of the disk 51, the motor 60 is preferably disposed as far out on the outer peripheral side as possible.

The fixed component 53 is used to fix the fixed frame 10 to the base 50. A screw or the like is inserted into a hole provided inside the fixed component 53, and the fixed frame 10 is fixed to the fixed component 53 with this screw. Therefore, the positional relation between the base 50, the motor 60, and the fixed frame 10 to each other does not vary, and is fixed.

Figure 5:
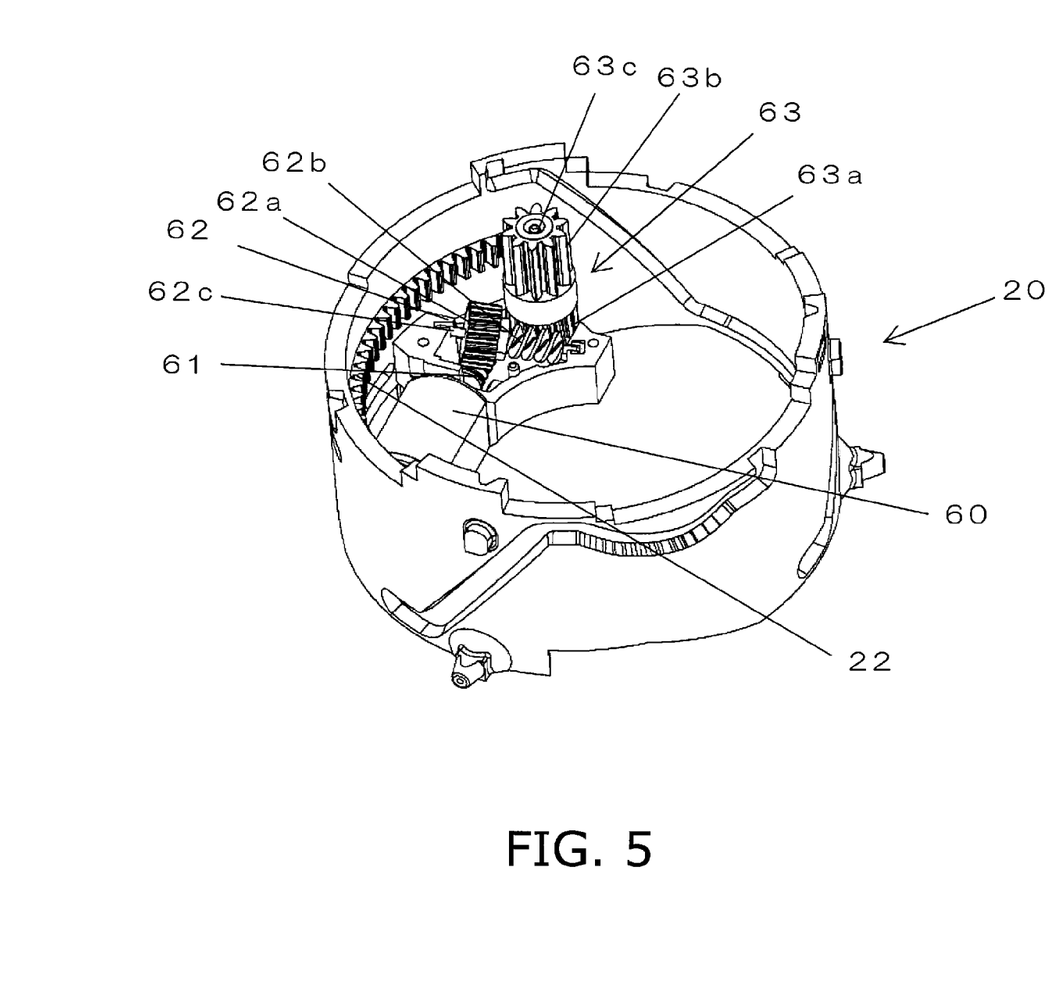
FIG. 5 is an oblique view of the configuration of a reduction mechanism included in the lens barrel in FIG. 1.

FIG. 5 is an oblique view illustrating the positional relation between the motor shaft gear 61, the reduction gear 62, and the drive gear 63 in the rotary frame 20. To facilitate an understanding, the base 50 and the cover that covers the motor shaft gear 61, the reduction gear 62, and the drive gear 63 are not shown here.

The motor shaft gear 61 is a worm gear attached to the rotary shaft of the motor 60. The rotary shaft of the motor 60 is disposed in a plane that is perpendicular to the rotational axis direction of the rotary frame 20.

The reduction gear 62 is constituted by combining a worm wheel 62a and a worm gear 62b coaxially. The rotary shaft 62c of the reduction gear 62 three-dimensionally intersects the rotary shaft of the motor 60 diagonally. The teeth of the worm wheel 62a are inclined according to the intersection angle between the rotary shaft 62c of the reduction gear 62 and the rotary shaft of the motor 60. The worm wheel 62a meshes with the motor shaft gear 61 and accepts drive force from the motor 60.

The drive gear 63 is constituting by combining a worm wheel 63a and a spur gear 63b coaxially. The axial direction of the rotary shaft 63c of the drive gear 63 coincides with the rotational axis direction of the rotary frame 20. Accordingly, the direction along the teeth of the spur gear 63b coincides with the rotational axis direction of the rotary frame 20.

The worm wheel 63a meshes with the worm gear 62b and accepts drive force from the motor 60 via the reduction gear 62.

The spur gear 63b meshes with the gear component 22 formed on the inner peripheral surface of the rotary frame 20. Consequently, the rotary frame 20 can be rotated by rotating the drive gear 63. That is, the drive gear 63 transmits the drive force of the motor 60 to the rotary frame 20.

With the lens barrel 100 in this embodiment, as discussed above, the direction in which motor drive force is transmitted is changed by a reduction mechanism consisting of the motor shaft gear 61, the reduction gear 62, and the worm wheel 63a.

More specifically, the direction along the rotary shaft of the motor 60 coincides with a direction that is perpendicular to the rotational axis direction of the rotary frame 20, whereas the direction along the rotary shaft 63c of the drive gear 63 coincides with the rotational axis direction of the rotary frame 20. Consequently, the motor 60 and the drive gear 63 do not have to be disposed aligned longitudinally in the rotational axis direction of the rotary frame 20, and can be disposed aligned laterally. Thus, the layout space of the motor 60 and the drive gear 63 can be reduced in the rotational axis direction of the rotary frame 20. As a result, the lens barrel 100 can be shorter in the rotational axis direction of the rotary frame 20. To put this in more specific terms, the size of the lens barrel 100 when retracted can be made more compact.

4. Description of Operation

Next, the change in the positional relation between the motor 60 and the rotary frame 20 when the rotary frame 20 rotates will be described through reference to FIGS. 6 and 7.

Figure 6:
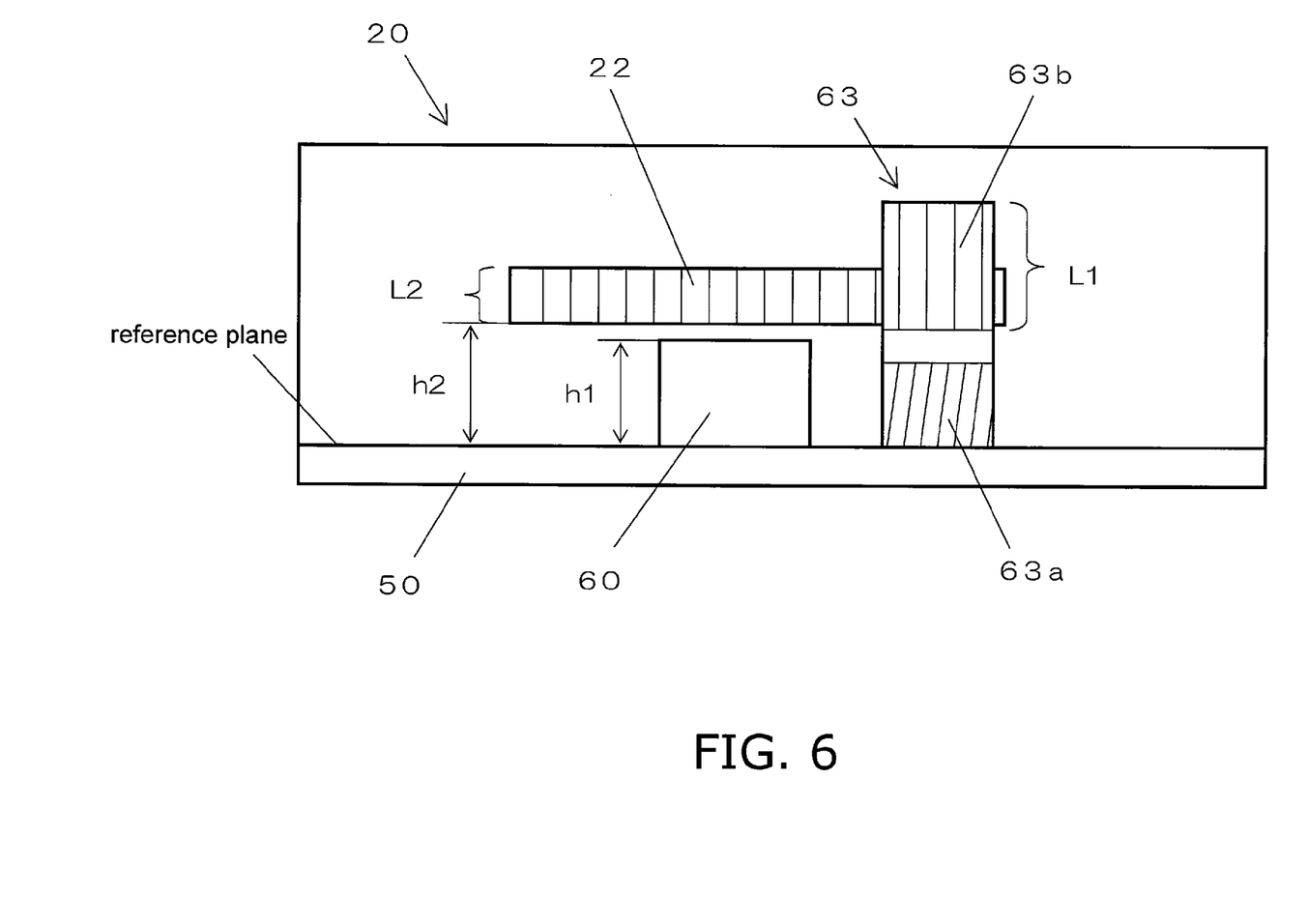
FIG. 6 is a schematic view of the positional relation between the rotary frame and the motor when the lens barrel is retracted.

FIG. 6 schematically shows the positional relation between the base 50, the motor 60, and the rotary frame 20 when the rotary frame 20 has moved into an abutting relationship with the base 50 (telescoped state).

The motor 60 is fixed to the base 50. If we use the surface of the base 50 to which the motor 60 is fixed as a reference (hereinafter referred to as the reference surface), the attachment height of the motor 60 is h1 as shown in the drawing. In contrast, the end of the gear component 22 closer to the base 50 is positioned at a height h2 from the reference surface. Here, the height h2 is greater than the height h1. Therefore, even when the rotary frame 20 has moved into an abutting relationship with the base 50, the gear component 22 does not interfere with the motor 60. As a result, the motor 60 can be disposed closer to the inner peripheral surface 21.

If the height h2 were less than the height h1, then the motor 60 would have to be disposed at a more distant position that does not overlap the gear component 22 in plan view. In other words, the motor 60 must be separated from the inner peripheral surface 21 of the rotary frame 20 by a distance that is at least equal to the height of the teeth of the gear component 22. In this case, a drawback is that the diameter of the opening 52 is smaller, or the outside diameter of the disk 51 is larger.

Either case is undesirable in terms of obtaining a lens barrel that is high in performance yet compact.

In view of this, in this embodiment the gear component 22 is disposed so that the gear component 22 will not interfere with the motor 60 even when the rotary frame 20 has moved into an abutting relationship with the base 50.

In other words, as the rotary frame 20 rotates, if the gear component 22 moves to the position where the motor 60 is fixed, the motor 60 is disposed between the base 50 and the gear component 22 in the rotational axis direction of the rotary frame 20.

Also, the end of the gear component 22 on the reference surface side substantially coincides with the end of the spur gear 63b of the drive gear 63 on the reference surface side. The reason that the end of the gear component 22 and the end of the drive gear 63 do not coincide completely here is that manufacturing tolerance and so forth are taken into account.

Also, with the lens barrel 100 of this embodiment, as shown in FIG. 6, the gear length L1 of the spur gear 63b is greater than the gear length L2 of the gear component 22. As will be discussed below, as the rotary frame 20 advances and retracts, the gear component 22 moves within the range of the gear length L1 of the spur gear 63b. Consequently, the length over which the gear component 22 and the spur gear 63b are meshed is always constant and the same as the gear length L2 within the range in which the rotary frame 20 advances and retracts.

Here, if the only thing to consider were that the meshing length of the gear component 22 and the spur gear 63b always be constant with the range in which the rotary frame 20 advances and retracts, then the gear length L2 of the gear component 22 could be increased, and the gear length L1 of the drive gear 63 (the spur gear 63b) could be decreased. In this case, however, since the gear length L2 of the gear component 22 is longer, it is more difficult to dispose the gear component 22 on the inner peripheral surface 21 of the rotary frame 20. Accordingly, as shown in FIG. 6, having the gear length L1 being greater than the gear length L2 is advantageous in terms of making the lens barrel 100 more compact.

Also, if the gear length L1 of the drive gear 63 (the spur gear 63b) is decreased and the gear length L2 of the gear component 22 is increased in order to achieve a constant meshing length, there is the risk that the axial direction length of the spur gear 63b on the drive gear 63 side will be shorter and strength will end up decreasing. If the gear length L2 on the gear component 22 side is decreased, there will be almost no effect on the strength of the gear component 22 or the rotary frame 20 even if the width of the gear component 22 formed on the inner peripheral surface side of the rotary frame 20 is reduced. Thus, with the strength of the drive gear 63 (the spur gear 63b) in mind, it is preferable if the gear length L1 on the drive gear 63 side is increased, and the gear length L2 of the gear component 22 is decreased so as to achieve a constant meshing length, as shown in FIG. 6.

Figure 7:
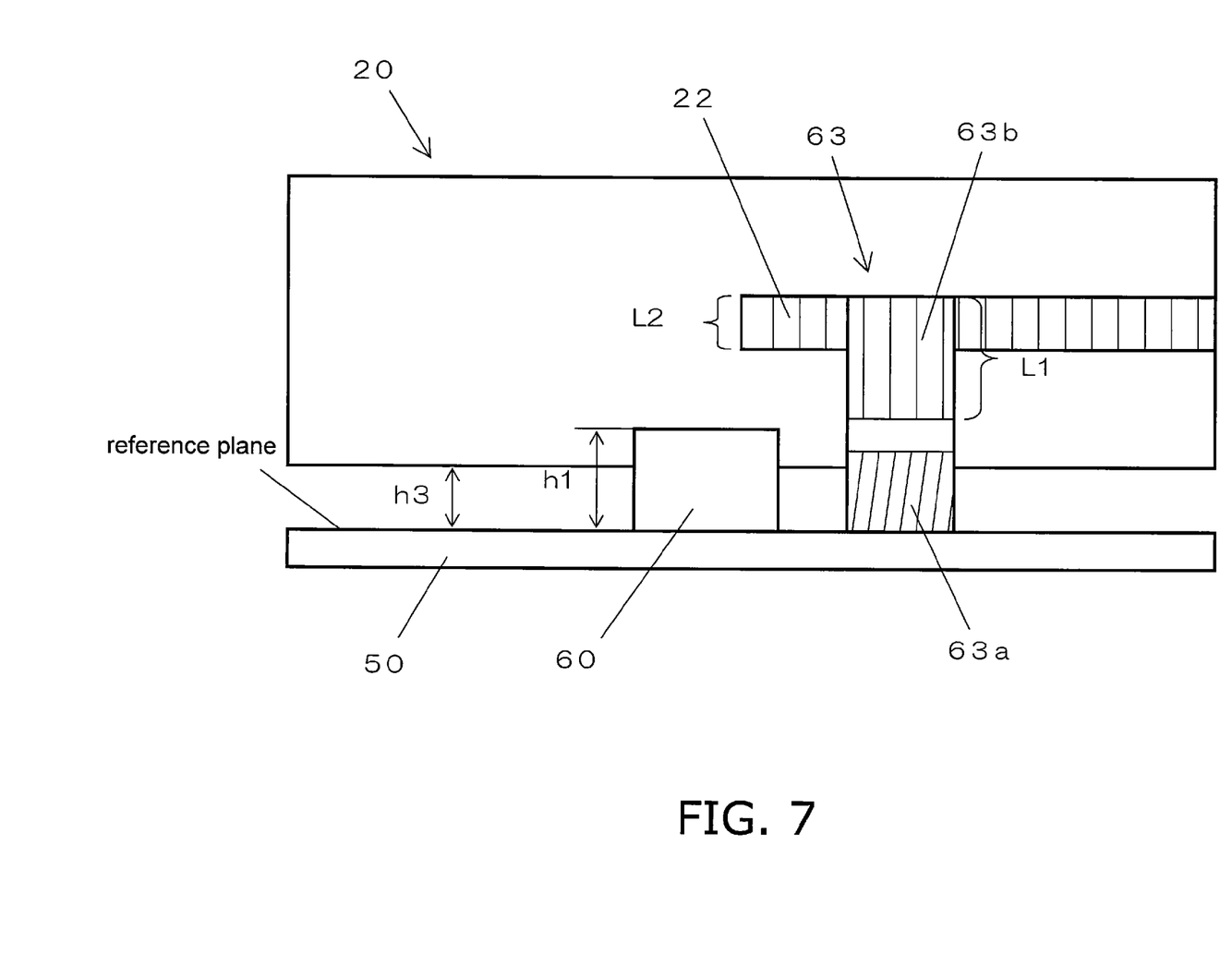
FIG. 7 is a schematic view of the positional relation between the rotary frame and the motor when the lens barrel is in use.

FIG. 7 schematically shows the positional relation between the base 50, the motor 60, and the rotary frame 20 when the rotary frame 20 has moved to a position that is away from the base 50 (in the usage state (during imaging or during the preparatory period)).

When the drive gear 63 rotates, the gear component 22 moves to the right in FIG. 7. That is, the rotary frame 20 rotates to the right. Along with this rotation, the rotary frame 20 moves away from the base 50 by a length h3. As the rotary frame 20 moves away from the base 50, the gear component 22 also moves away from the motor 60, so the gear component 22 does not come into contact with the motor 60.

If the rotary frame 20 has moved to a position that is farthest away from the base 50, then an end (or an edge) of the gear component 22 disposed farthest away from the surface (or end) of base 50 will be substantially aligned or leveled with an end (or an edge) of the spur gear 63b also disposed farthest away from the surface (or end) of base 50. Consequently, the gear length L1 of the spur gear 63b is no longer than necessary, and the drive gear 63 can be more compact.

As discussed above, if we also take into account the positional relation between the gear component 22 and the spur gear 63b when the rotary frame 20 is closest to the base 50, the gear length L1 is preferably either substantially the same as the total of the gear length L2 and the length h3, or is slightly greater than the total of the gear length L2 and the length h3. Consequently, there is no need to increase the gear length L1 of the spur gear 63b more than necessary, and the drive gear 63 can be made more compact within a practical range.

Also, as discussed above, the direction of the groove formed in the spur gear 63b coincides with the rotational axis direction of the rotary frame 20. Since the spur gear 63b and the gear component 22 mesh, the direction of the groove formed in the gear component 22 also coincides with the rotational axis direction of the rotary frame 20. Consequently, even if there is some looseness in the direction in which the rotary frame 20 advances and retracts, the advancing and retracting motion of the rotary frame 20 will not be hindered by the meshing relation between the gear component 22 and the spur gear 63b. This is because there is little resistance when the gear component 22 slides along the groove of the spur gear 63b.

5. Conclusion (1)

As discussed above, the lens barrel 100 in this embodiment comprises the base 50, the motor 60, the drive gear 63, and the rotary frame 20 as shown in FIG. 1. The motor 60 is fixed to the base 50. The drive gear 63 transmits the drive force of the motor 60, and does not move with respect to the base 50. The rotary frame 20 is a substantially cylindrical frame, has the gear component 22 that meshes with the spur gear 63b on at least part of the inner peripheral surface 21, is rotated with respect to the base 50 by the rotation of the drive gear 63, and advances and retracts in the rotational axis direction along with this rotation. The gear length L1 of the spur gear 63b of the drive gear 63 is greater than the gear length L2 of the gear component 22, as shown in FIGS. 6 and 7. The gear component 22 moves within the range of the gear length L1 of the spur gear 63b as the rotary frame 20 advances and retracts.

Consequently, the length over which the gear component 22 and the spur gear 63b are meshed is always constant and the same as the gear length L2 within the range in which the rotary frame 20 advances and retracts. Since the meshing length of the gears is constant when the rotary frame 20 is driven, the drive force of the rotary frame 20 can be easily controlled. Accordingly, a high-performance lens barrel can be obtained.

(2)

Also, with the lens barrel 100 in this embodiment, as shown in FIG. 7, in a usage state in which the rotary frame 20 is farthest away from the base 50, the spur gear 63b and the gear component 22 are disposed so that an end (or an edge) of the spur gear 63b on the opposite side from the base 50 will be substantially even or aligned with an end (or an edge) of the gear component 22 on the opposite side from the base 50.

Consequently, there is no need to increase the gear length L1 of the spur gear 63b more than necessary, and the drive gear 63 can be made more compact.

(3)

Also, in this embodiment, as shown in FIG. 6, when the lens barrel 100 is in a retracted state, the rotary frame 20 is configured to abut the base 50. Accordingly, an end (or an edge) of the spur gear 63b disposed closest to the surface (or end) of base 50 is substantially aligned or leveled with an end (or an edge) of the gear component 22 also disposed close to base 50.

Consequently, there is no need to increase the gear length L1 of the spur gear 63b more than necessary, and the drive gear 63 can be made more compact.

(4)

Also, with the lens barrel 100 in this embodiment, as shown in FIG. 6, when the gear component 22 has moved to the position where the motor 60 is fixed as the rotary frame 20 rotates, the motor 60 remains spaced apart from the gear component 22.

Consequently, even if the rotary frame 20 moves into an abutting relationship with the base 50, the gear component 22 will not interfere with the motor 60. Accordingly, the motor 60 can be positioned closer to the inner peripheral surface 21. This means that a lens barrel that is high in performance yet compact can be obtained.

(5)

Also, with the lens barrel 100 in this embodiment, as shown in FIG. 1, etc., the direction of the groove formed in the gear component 22 is parallel to the rotational axis direction of the rotary frame 20.

Consequently, the advancing and retracting motion of the rotary frame 20 is not impaired by meshing of the gear component 22 and the spur gear 63b. Accordingly, the advancing and retracting motion of the rotary frame 20 can be smoother, so a high-performance lens barrel can be obtained.

(6)

Also, with the lens barrel 100 in this embodiment, as shown in FIG. 5, the drive gear 63 is used, in which a plurality of gears (the worm wheel 63a and the spur gear 63b) are disposed coaxially.

Consequently, a shared rotary shaft can be used to rotate a plurality of gears, so the configuration of the drive gear 63 can be simplified. As a result, the lens barrel 100 can be made more compact.

(7)

Also, with the lens barrel 100 in this embodiment, as shown in FIG. 5, the worm wheel 63a, which changes the direction in which the drive force of the motor 60 is transmitted, is used as a plurality of gears disposed coaxially.

Consequently, the motor 60 and the drive gear 63 do not have to be disposed aligned longitudinally in the rotational axis direction of the rotary frame 20, and can be disposed aligned laterally. Thus, the layout space of the motor 60 and the drive gear 63 can be reduced in the rotational axis direction of the rotary frame 20. As a result, the lens barrel 100 can be shorter in the rotational axis direction of the rotary frame 20, and the size of the lens barrel 100 when retracted can be made more compact.

In this embodiment, the motor 60 is an example of a driver, and the spur gear 63b is an example of a drive gear.

Second Embodiment

A lens barrel 101 pertaining to another embodiment will now be described through reference to FIGS. 8 and 9.

In Embodiment 1 above, the lens barrel 100 had the gear component 22 disposed in a plane that was perpendicular to the rotational axis direction of the rotary frame 20. However, the lens barrel 101 in this embodiment differs from the configuration of Embodiment 1 above in that it has a stepped shape matching the advance and retraction of the rotary frame 20. The rest of the configuration is the same, so those components used in Embodiment 1 above will be numbered the same here, and will not be described in detail again.

Figure 8:
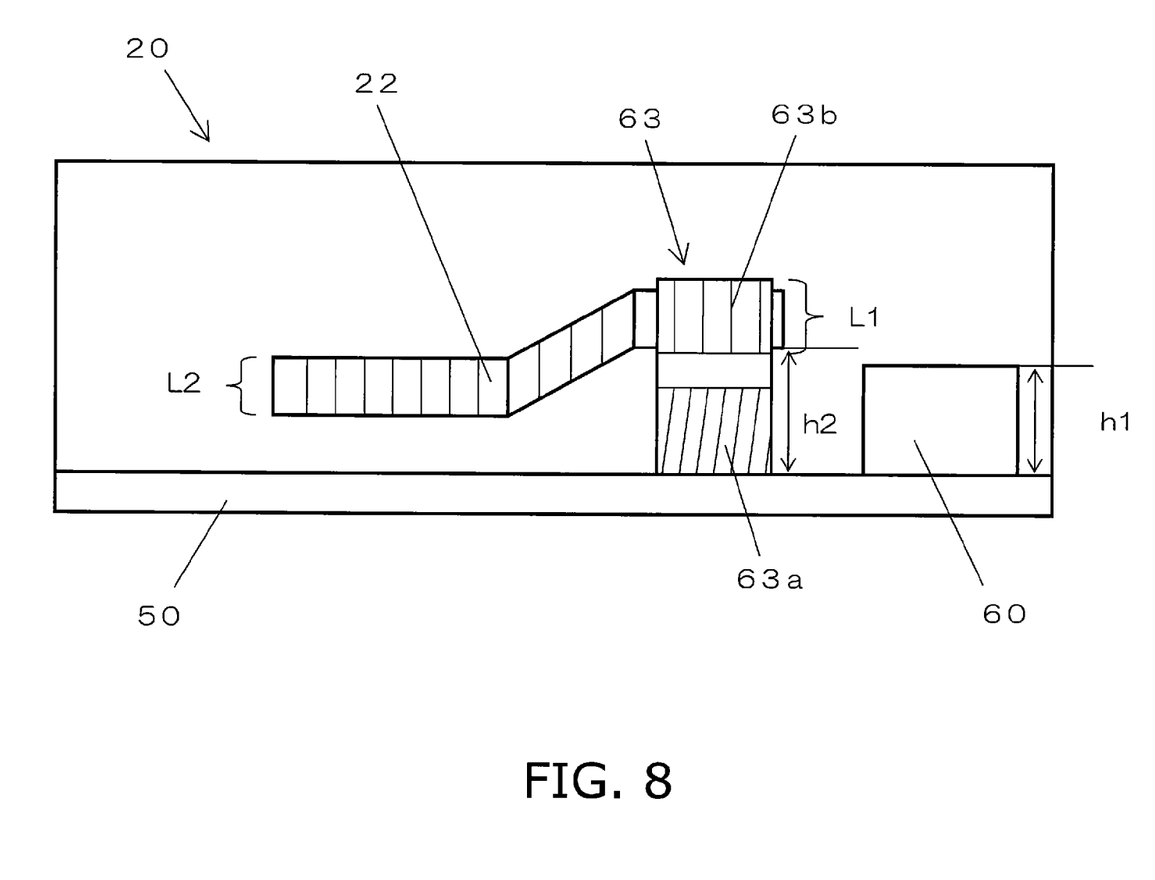
FIG. 8 is a schematic view of the positional relation between the rotary frame and the motor when the lens barrel is retracted.

FIG. 8 is a schematic view of the positional relation between the base 50, the motor 60, and the rotary frame 20 in a state in which the rotary frame 20 has moved into an abutting relationship with the base 50.

The gear component 22 is formed by rotating the shape of the cam groove 11 formed in the inner peripheral surface of the fixed frame 10 by 180 degrees. The motor 60 is disposed further to the right side in FIG. 8 than the drive gear 63. The gear length L1 of the spur gear 63b is set to be substantially the same as or slightly greater than the gear length L2 of the gear component 22. Accordingly, the gear length L1 can be shorter than with the configuration in Embodiment 1.

As is clear from FIG. 8, the portion of the gear component 22 formed on the motor 60 side is at a height of h2 from the base 50, which is greater than the height h1 of the motor 60, so the rotary frame 20 will not interfere with the motor 60 when the rotary frame 20 rotates.

Figure 9:
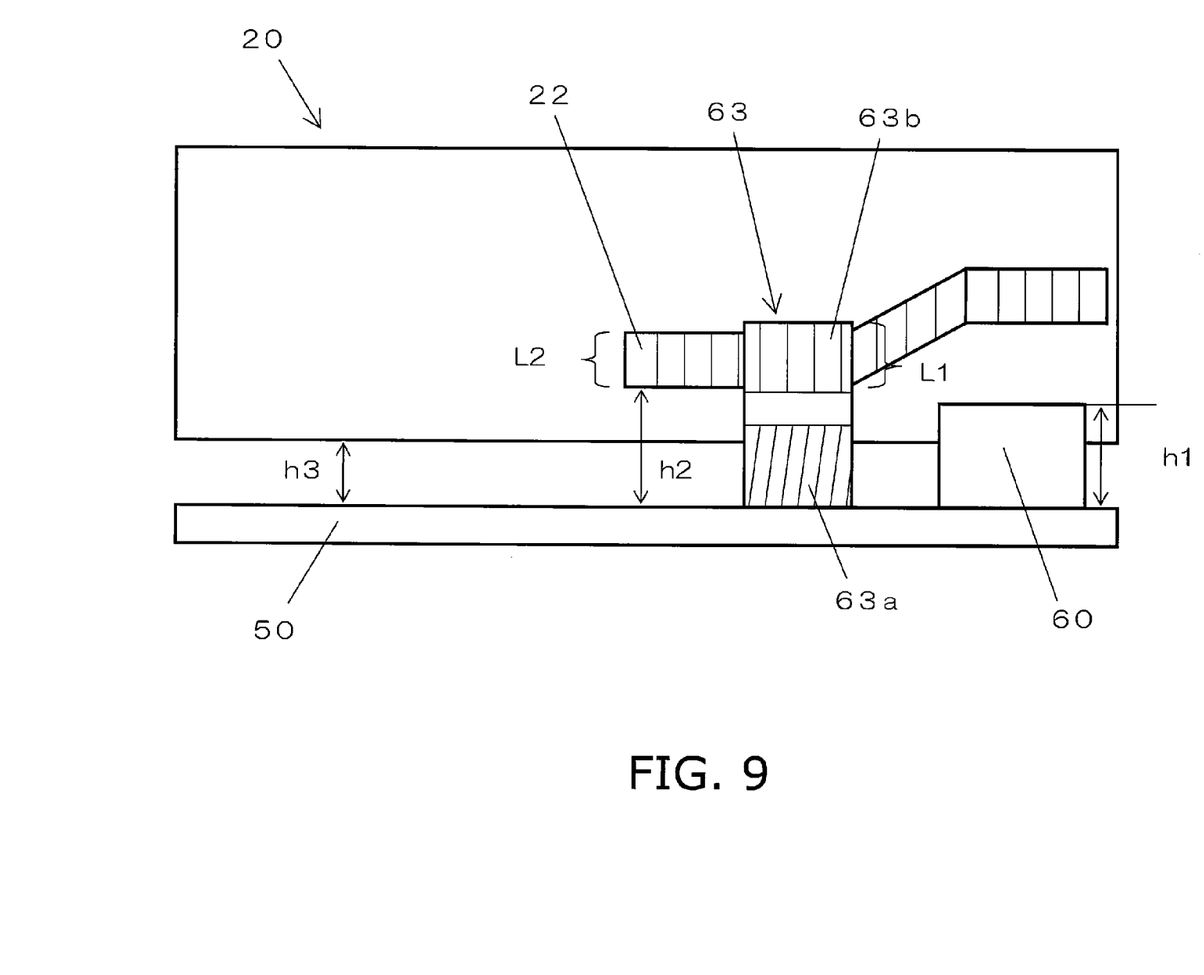
FIG. 9 is a schematic view of the positional relation between the rotary frame and the motor when the lens barrel is in use.

FIG. 9 is a schematic view of the positional relation between the base 50, the motor 60, and the rotary frame 20 in a state in which the rotary frame 20 has moved farthest away from the base 50.

Here, as the rotary frame 20 rotates, the gear component 22 moves away from the base 50 (the motor 60). Accordingly, a gap can be maintained between the gear component 22 and the motor 60 even if the portion of the gear component 22 disposed closest to the base 50 should move close to the motor 60, so interference by the gear component 22 with the motor 60 can be avoided.

As discussed above, with the lens barrel 101 in this embodiment, the shape of the gear component 22 is adjusted so that the distance between the gear component 22 and the motor 60 can be maintained even when the rotary frame 20 advances and retracts, so a spur gear 63b with a shorter gear length L1 is used. As a result, a lens barrel 101 that is high in performance yet compact can be obtained.

Other Embodiments

The technology disclosed herein is not limited to the above embodiments, and various modifications and alterations are possible without departing from the scope of the disclosure.

Other embodiments of the present disclosure will therefore will described below.

(A)

In the above embodiments, an example was described in which a motor intended to change the zoom ratio was installed as the motor 60, but the present disclosure is not limited to this.

For example, the motor may be one intended to change the focal state. Nor is the motor 60 limited to being a DC motor, and another type of motor (such as a stepping motor) may be used instead.

(B)

In the above embodiments, an example was described in which the reduction mechanism consisted of the motor shaft gear 61, the reduction gear 62, and the drive gear 63, but the present disclosure is not limited to this.

For example, the present disclosure can also be applied to a lens barrel equipped with a mechanism for transmitting the drive force of the motor 60 to the rotary frame 20 with a configuration other than that given above.

(C)

In the above embodiments, an example was described in which a reduction mechanism consisting of the motor shaft gear 61, the reduction gear 62, and the drive gear 63 transmitted the rotation of the rotary shaft of the motor 60 to the gear component 22 after reducing its speed, but the present disclosure is not limited to this.

For example, a mechanism may be installed that transmits the rotation of the rotary shaft of the motor without reducing its speed. In other words, as long as the drive force of the motor 60 can be transmitted to the rotary frame 20, the rest is not limited to what is given in the above embodiments.

(D)

In the above embodiments, an example was described in which the teeth of the gear component 22 were formed in a direction parallel to the direction in which the rotary frame 20 advanced and retracted with respect to the fixed frame 10, but the present disclosure is not limited to this.

For example, the groove of the gear component 22 may be a so-called worm wheel, which is formed at an angle to the direction of advance and retraction. In this case, it is good for the drive gear 63 that meshes with the gear component 22 to be a worm wheel as well.

(E)

In the above embodiments, an example was described in which the worm wheel 63a was used as a gear included in the drive gear 63, but the present disclosure is not limited to this.

For example, a spur gear may be used instead of a worm wheel.

(F)

In the above embodiments, an example was described in which the width of the gear component 22 was made less than that of the drive gear 63, and the gear component 22 moved within the range of the width of the spur gear of the drive gear 63, in order to keep the meshing length constant between the gear component 22 and the drive gear 63 (the spur gear 63b), as shown in FIG. 6 and elsewhere, but the present disclosure is not limited to this.

Figure 10:
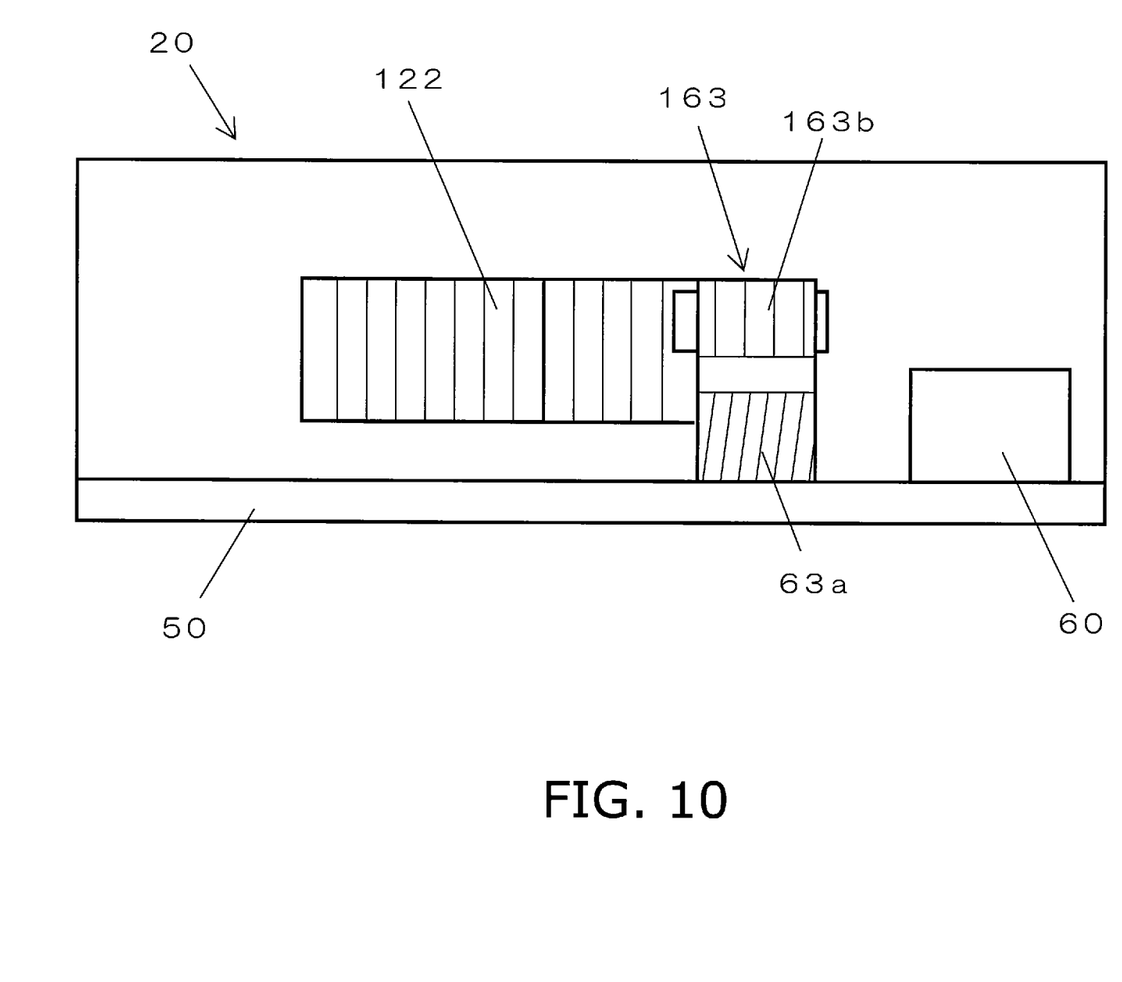
FIG. 10 is a schematic view of the positional relation between the rotary frame and the motor in a lens barrel pertaining to another embodiment.

For example, as shown in FIG. 10, a drive gear 163 (spur gear 163b) with a narrower width may be combined with a gear component 122 that is wider than the drive gear 163.

Here again, the meshing length can be kept constant between the gear component 122 and the spur gear 163b of the drive gear 163.

In this case, however, there is the risk that the rotary frame 20 having the gear component 122 formed in its inner peripheral surface will become bulkier, and that the motor 60 and the gear component 122 will be more apt to interfere, among other such disadvantages, so in terms of obtaining a product that is more compact, it is preferable to employ the configuration in Embodiment 1 above.

(G)

In the above embodiments, as shown in FIG. 6 and elsewhere, an example was described in which the width of the gear component 22 was made less than that of the drive gear 63, and the gear component 22 moved within the range of the width of the spur gear of the drive gear 63, in order to keep the meshing length constant between the gear component 22 and the drive gear 63, but the present disclosure is not limited to this.

Figure 11:
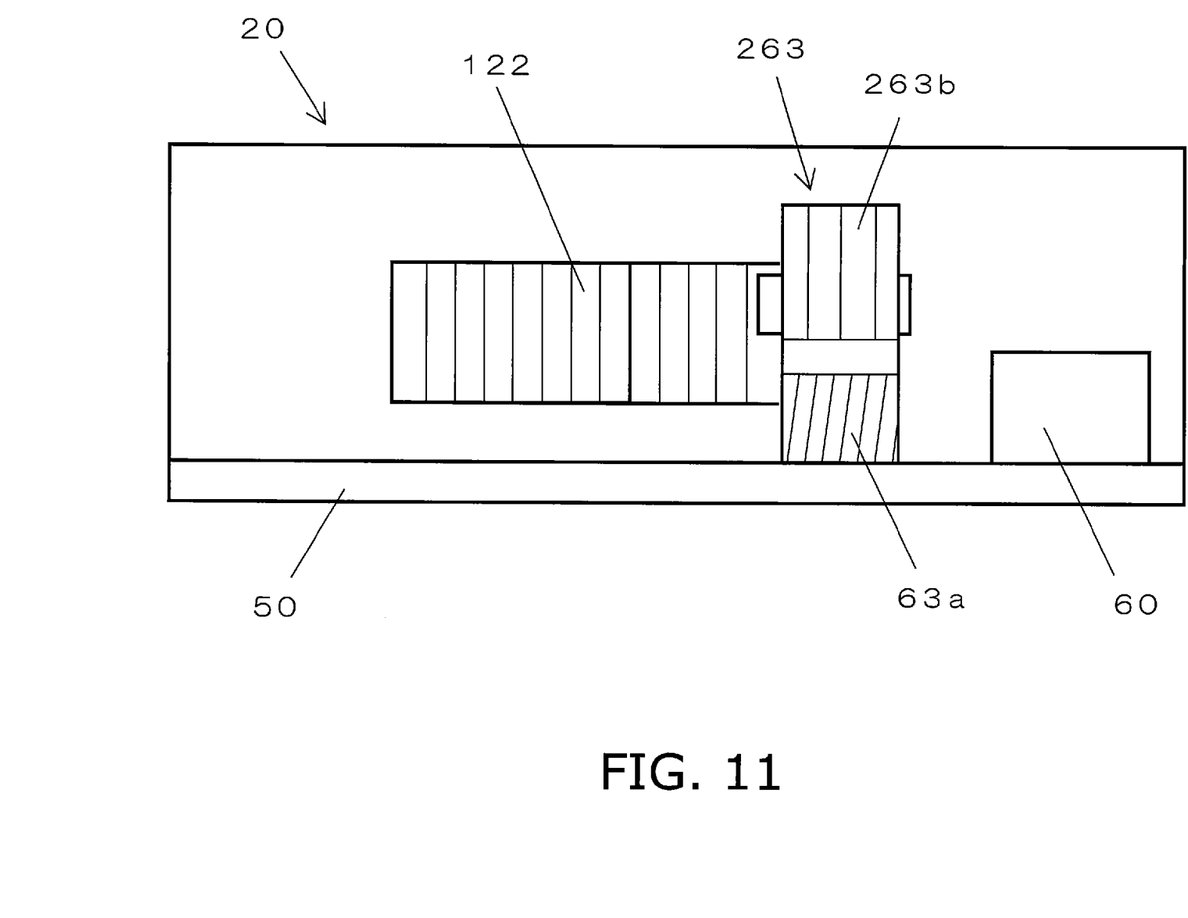
FIG. 11 is a schematic view of the positional relation between the rotary frame and the motor in a lens barrel pertaining to yet another embodiment.

For example, as shown in FIG. 11, a wide gear component 122 may be combined with a drive gear 263 (spur gear 263b) having the same width as the gear component 122.

In this case, however, a drawback is that movement of the rotary frame 20 can result in fluctuation in the meshing length between the gear component 122 and the drive gear 263 (the spur gear 263b), making the torque of the motor 60 unstable.

Accordingly, from the standpoint of the stable transmission of the drive force of the motor 60, it is preferable to employ a combination such that the meshing length will be constant between the gear component 22 and the drive gear 63, as in the above embodiments.

INDUSTRIAL APPLICABILITY

The lens barrel described above can be widely applied to digital still cameras, movie cameras, and other such optical devices.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member," "unit" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel or an imaging device equipped with the lens barrel. Accordingly, these terms, as utilized to describe the technology disclosed herein should be interpreted relative to the lens barrel or an imaging device equipped with the lens barrel.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present disclosure, it will be apparent to those skilled in the art from this disclosure that various changes and modifications can be made herein without departing from the scope of the invention as defined in the appended claims. Furthermore, the foregoing descriptions of the embodiments according to the present disclosure are provided for illustration only, and not for the purpose of limiting the invention as defined by the appended claims and their equivalents. Thus, the scope of the invention is not limited to the disclosed embodiments.

What is claimed is:

1. A lens barrel comprising:
a base component;
a driver fixed to the base component and configured to produce a driving force;
a drive gear fixedly disposed relative to the base component and configured to transmit the driving force produced by the driver; and a rotary frame having a substantially cylindrical shape and a gear component disposed on at least part of the inner peripheral surface of the rotary frame, the gear component meshes with the drive gear so that during rotation of the drive gear the rotary frame rotates, by way of the driving force, relative to the base component and advances and retracts along a rotational axis of the lens barrel, the length of the drive gear is greater than the length of the gear component, and as the rotary frame and the gear component advance and retract, the gear component remains within a range of opposing ends of the drive gear.

2. A lens barrel comprising:

a base component;

a driver fixed to the base component and configured to produce a driving force;

a rotatable drive gear fixedly coupled to the base component and configured to transmit the drive force produced by the driver; and a rotary frame having a substantially cylindrical shape and a gear component coupled to at least part of the inner peripheral surface of the rotary frame, the gear component meshes with the drive gear so that during rotation of the drive gear the rotary frame rotates relative to the base component, and advances and retracts along a rotational axis of the lens barrel, the length of the drive gear is less than the length of the gear component, and as the rotary frame and the gear component advance and retract relative to the base component, the drive gear remains within opposing ends of the gear component.

3. The lens barrel according to claim 1, wherein the drive gear and the gear component are positioned relative to each other so that the rotary frame is remotely disposed away from the base component, an end of the drive gear and an end of the gear component are remotely disposed away from the base component, the end of the drive gear is configured to be substantially aligned with the end of the gear component.

4. The lens barrel according to claim 1, wherein the drive gear and the gear component are positioned relative to each other so that the rotary frame is configured to abut the base component, an end of the drive gear and an end of the gear component are disposed relatively close to the base component, the end of the drive gear is configured to be substantially aligned with the end of the gear component.

5. The lens barrel according to claim 1, wherein when the gear component, along with rotation of the rotary frame, moves to the position where the driver is fixed, the driver remains spaced apart from the gear component.

6. The lens barrel according to claim 1, wherein the direction of the teeth formed on the gear component are parallel to the advancing and retracting direction of the rotary frame.

7. The lens barrel according to claim 1, wherein the drive gear has a plurality of gears coaxially disposed relative to one another.

8. The lens barrel according to claim 7, wherein the plurality of gears include a gear configured to change the direction in which the driving force of the driver is transmitted.

9. The lens barrel according to claim 2, wherein the drive gear and the gear component are positioned relative to each other so that the rotary frame is remotely disposed away from the base component, an end of the drive gear and an end of the gear component are remotely disposed away from the base component, the end of the drive gear is configured to be substantially aligned with the end of the gear component.

10. The lens barrel according to claim 2, wherein the drive gear and the gear component are positioned relative to each other so that the rotary frame is configured to abut the base component, an end of the drive gear and an end of the gear component are disposed relatively close to the base component, the end of the drive gear is configured to be substantially aligned with the end of the gear component.

11. The lens barrel according to claim 2, wherein when the gear component, along with rotation of the rotary frame, moves to the position where the driver is fixed, the driver remains spaced apart from the gear component.

12. The lens barrel according to claim 2, wherein the direction of the teeth formed on the gear component are parallel to the advancing and retracting direction of the rotary frame.

13. The lens barrel according to claim 2, wherein the drive gear has a plurality of gears coaxially disposed relative to one another.

14. The lens barrel according to claim 13, wherein the plurality of gears include a gear configured to change the direction in which the driving force of the driver is transmitted.

15. A lens barrel comprising:

a base component;

a driver fixed to the base component, and configured to produce a driving force;

a drive gear coupled to the base component, and configured to transmit the driving force; and a rotary frame having a substantially cylindrical shape, and including a gear component formed on at least part of an inner peripheral face of the rotary frame, the gear component configured to:
  mesh with the drive gear such that the driving force rotates the drive gear relative to the base component, advance along a rotational axis of the lens barrel, and retract along a rotational axis of the lens barrel;

wherein the length of the drive gear is greater than the length of the gear component, and as the rotary frame and the gear component advance and retract, the gear component remains within a range of opposing ends of the drive gear.

16. The lens barrel according to claim 1, wherein the gear component is formed on at least part of the inner peripheral face of the rotary frame.

17. The lens barrel according to claim 2, wherein the gear component is formed on at least part of the inner peripheral face of the rotary frame.

* * * * *